United States Patent [19]

Tanaka et al.

[11] Patent Number: 4,578,581
[45] Date of Patent: Mar. 25, 1986

[54] RADIATION IMAGE READ-OUT METHOD AND APPARATUS

[75] Inventors: Hiroshi Tanaka; Hisatoyo Kato, both of Kanagawa, Japan

[73] Assignee: Fuji Photo Film Co., Ltd., Kanagawa, Japan

[21] Appl. No.: 517,305

[22] Filed: Jul. 26, 1983

[30] Foreign Application Priority Data

Jul. 27, 1982 [JP] Japan ................... 57-130939

[51] Int. Cl.$^4$ .................................. G03C 5/16
[52] U.S. Cl. .......................... 250/327.2; 250/484.1
[58] Field of Search ............. 250/337, 327.2, 484.1; 378/146

[56] References Cited

U.S. PATENT DOCUMENTS

| | | | |
|---|---|---|---|
| 4,179,100 | 12/1979 | Sashin et al. | 250/366 |
| 4,284,889 | 8/1981 | Kato et al. | 250/337 |
| 4,368,384 | 1/1983 | Kato et al. | 250/354.1 |
| 4,496,973 | 1/1985 | Horikawa et al. | 250/327.2 |
| 4,498,006 | 2/1985 | Horikawa et al. | 250/327.2 |
| 4,527,060 | 7/1985 | Suzuki et al. | 250/327.2 |
| 4,527,061 | 7/1985 | Horikawa et al. | 250/327.2 |

Primary Examiner—Carolyn E. Fields
Attorney, Agent, or Firm—Sughrue, Mion, Zinn, Macpeak & Seas

[57] ABSTRACT

In a radiation image read-out system wherein a stimulable phosphor sheet carrying a radiation image stored therein is exposed to stimulating rays which cause it to emit light in proportion to the radiation energy stored, and the emitted light is photoelectrically read out to reproduce a visible image, preliminary read-out for detecting the radiation image is conducted by uniformly exposing the whole surface of the stimulable phosphor sheet to stimulating rays prior to final read-out, and detecting the amount of light emitted from the whole surface of the stimulable phosphor sheet. Or, preliminary read-out is conducted by exposing the stimulable phosphor sheet to stimulating rays slitwise over the entire sheet width while the slit-like exposure section is moved with respect to the stimulable phosphor sheet, and detecting the amount of light emitted from the sheet.

10 Claims, 2 Drawing Figures

RADIATION IMAGE READ-OUT METHOD AND APPARATUS

BACKGROUND OF THE INVENTION

1. Field of the Invention

This invention relates to a radiation image read-out method wherein a stimulable phosphor sheet carrying a radiation image stored therein is exposed to stimulating rays which cause the stimulable phosphor sheet to emit light in the pattern of the stored image, wherein the emitted light is photoelectrically read out by a photodetector, and an apparatus for carrying out the method.

2. Description of the Prior Art

When certain kinds of phosphors are exposed to a radiation such as X-rays, α-rays, β-rays, γ-rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and read-out system. Specifically, the stimulable phosphor formed on a sheet is first exposed to a radiation passing through an object to have a radiation image stored therein, and is then scanned with stimulating rays such as a laser beam which cause it to emit light in the pattern of the stored image. The light emitted from the stimulable phosphor sheet upon stimulation thereof is photoelectrically detected and converted to an electric image signal, which is processed as desired to reproduce a visible image on a recording medium such as a photographic lightsensitive material or on a display device such as a cathode ray tube (CRT).

This radiation image system using the stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored in the phosphor varies over a very wide range in proportion to the amount of energy stored therein, it is possible to obtain an image having desirable density regardless of the amount of exposure of the phosphor to the radiation by reading out the emitted light with an appropriate read-out gain and coverting it to an electric signal to reproduce a visible image on a recording medium or a display device. The electric signal may further be processed as desired to obtain a radiation image suitable for viewing, particularly for diagnostic purposes. This is very advantageous in practical use.

As mentioned above, in the radiation image system using a stimulable phosphor, deviation of the level of the radiation energy stored in the stimulable phosphor from a desired level can easily be compensated by setting the read-out gain to an appropriate value when photoelectrically reading out the light emitted from the stimulable phosphor upon stimulation thereof. Therefore, the quality of the reproduced radiation image is not adversely affected by a fluctuation in radiation dose due to fluctuating tube voltage or MAS value of the radiation source, a variation in the sensitivity of the stimulable phosphor or the photodetector, a change in radiation dose according to the condition of the object, or a fluctuation in the radiation transmittance according to the object etc. Also, it is possible to obtain a desirable radiation image even when the radiation dose to the object is low. Further, it is possible to obtain a radiation image having high image quality of high contrast, high sharpness and low noise etc. by once converting the light emitted from the stimulable phosphor into an electric signal, and processing the electric signal as desired. Particularly, when the radiation image is used for medical diagnosis, it is possible to obtain a radiation image processed in the manner most suitable for a particular portion of a human body such as the heart, the chest etc., thereby realizing an improvement in diagnostic efficiency and accuracy.

However, in order to eliminate various influences caused by the fluctuation of radiographic exposure conditions and/or obtain a radiation image having a high image quality or a high diagnostic efficiency and accuracy, it is necessary to investigate such image input conditions of the radiation image stored on the stimulable phosphor sheet as, for example, the level of radiation dose used for recording, or the image input pattern which is determined by a portion of the body (e.g. chest or abdomen) or the radiographic method used, such as plain image or contrasted image radiographing, before reproducing the radiation image to a visible image, and then to adjust the read-out gain appropriately or to process the electric signal appropriately based on the detected image input conditions or the image input pattern. The image input conditions and the image input pattern will hereinafter be simply referred to as the image input information when they are referred to generically. It is also necessary to determine the scale factor to optimize the resolution according to the contrast of the image input pattern.

Investigation of the image input information may be conducted prior to the visible image reproduction by use of the method as disclosed in U.S. Pat. No. 4,284,889, which is based on the finding that the amount of light instantaneously emitted from the stimulable phosphor sheet upon exposure thereof to stimulating rays is proportional to the amount of the radiation energy stored in the stimulable phosphor. In this method, image input information is investigated by detecting the instantaneously emitted light, and appropriate signal processing is conducted based on the image input information in order to obtain a visible radiation image having an improved image quality, particularly a high diagnostic efficiency and accuracy. In this method, since it is possible to adjust the read-out gain to an appropriate value, to select an appropriate scale factor, or to conduct an appropriate mode of signal processing, a radiation image suitable for viewing, particularly for diagnostic purpose, can be obtained regardless of fluctuation of the radiographic exposure conditions. However, since the recording of a radiation image in the stimulable phosphor sheet and read-out of the recorded image from the stimulable phosphor sheet are usually performed at different locations, a signal transfer system must be installed therebetween, necessitating a complicated and expensive apparatus.

Further, U.S. Pat. No. 4,276,473 discloses a method of estimating the image input conditions or the image input pattern of a radiation image stored in the stimulable phosphor by positioning a monitor phosphor sheet in the vicinity of the stimulable phosphor sheet, exposing it to a radiation and detecting the light emitted from the phosphor sheet by use of a photodetector. However, this method has the same drawback as that of the method disclosed in the aforesaid U.S. Pat. No. 4,284,889. Further, since the stimulable phosphor for recording the radiation image is not itself used as the means for detecting the image input information and only an indirect detecting means is used, it is impossible to obtain completely reliable image input information.

Various experiments conducted by the inventors revealed that a radiation image suitable for viewing, particularly for diagnostic purposes, can be obtained regardless of fluctuation of the radiographic exposure conditions by conducting in advance a read-out operation for detecting the image input information of a radiation image stored in a stimulable phosphor (hereinafter referred to as the preliminary read-out) by use of stimulating rays having stimulation energy lower than the stimulation energy of stimulating rays used in a read-out operation for obtaining a visible image for viewing, particularly for diagnostic purposes (hereinafter referred to as the final read-out), and thereafter conducting the final read-out. In the final read-out, the read-out gain is adjusted, and/or the scale factor is determined, and/or the image processing conditions are determined appropriately based on the image input information obtained by the preliminary read-out. The read-out gain and the scale factor are together referred to as the read-out conditions. In reading out a radiation image stored in a stimuable phosphor, it has heretofore been taken for granted by those skilled in the art that it is necessary to detect as much light as possible with a photodetector, as described in U.S. Pat. Nos. 4,258,264 and 4,302,671, and U.S. Pat. No. 4,346,295 (DE-OS No. 2,951,501), since the amount of light emitted from the stimulable phosphor upon stimulation thereof by stimulating rays is very small even when a stimulable phosphor having the highest sensitivity among those available is selected. Therefore, no one in the art considered intentionally dissipating the radiation energy stored in the stimulable phosphor only for the purpose of investigating the image input information. The findings of the inventors mentioned above are thus unexpected.

On the basis of these findings, the inventors proposed in U.S. Pat. No. 4,527,060 (European Patent Appln. Ser. No. 82305530.6) a method of and apparatus for reading out a radiation image wherein, before conducting the final read-out for obtaining a visible image for viewing, particularly for diagnostic purposes, a preliminary read-out is carried out to investigate the image input information of the radiation image stored in the stimulable phosphor sheet by use of stimulating rays having stimulation energy lower than the stimulation energy of the stimulating rays used in the final read-out.

The "stimulation energy" referred to in this invention means the effective energy of the stimulating rays which the stimulable phosphor sheet receives per unit area.

In the method and apparatus just described, the stimulation energy of the stimulating rays applied to the stimulable phosphor in the preliminary read-out should be lower than the stimulation energy of the stimulating rays used in the final read-out. As the ratio of the stimulation energy of the stimulating rays in the preliminary read-out to the stimulation energy of the stimulating rays in the final read-out approaches one, the amount of radiation energy remaining in the stimulable phosphor after the preliminary read-out decreases. It has been found that, when the aforesaid ratio is smaller than one, it is possible to obtain a radiation image suitable for viewing, particularly for diagnostic purposes, by appropriately adjusting the read-out gain, However, in order to obtain a radiation image having an improved image quality, particularly a high diagnostic efficiency and accuracy, the aforesaid ratio should preferably be as small as possible insofar as the image input information of the radiation image stored in the stimulable phosphor can be detected sufficiently to permit determination of the read-out conditions or the image processing conditions, that is, insofar as the light emitted from the stimulable phosphor in the preliminary read-out can be detected sufficiently for the above-mentioned purposes. Thus, the aforesaid stimulation energy ratio should generally be 50% or less, preferably 10% or less, more preferable 3% or less. The lower limit of this ratio is determined according to the accuracy of the system for detecting the light emitted from the stimulable phosphor in the preliminary read-out.

In order to make the stimulation energy of the stimulating rays in the preliminary read-out smaller than the stimulation energy of the stimulating rays in the final read-out, it is possible to use any known method. For example, the output level of the laser source used in the preliminary read-out may be decreased, the beam diameter of the laser beam may be increased, the scanning speed of the laser beam may be increased, or the moving speed of the stimulable phosphor sheet may be increased.

In the above-described method and apparatus, since the image input conditions of a radiation image stored in the stimulable phosphor can be investigated in advance, it is possible to obtain a radiation image having an improved image quality, particularly a high diagnostic efficiency and accuracy regardless of fluctuation of the radiographic exposure conditions by adjusting the read-out gain based on the detected image input information without using a read-out system having a wide dynamic range. Further, since the image input pattern of the radiation image stored in the stimulable phosphor can be investigated in advance, it is possible to obtain a radiation image having an improved image quality, particularly a high diagnostic efficiency and accuracy by processing the read-out electric signal in the manner most suitable for the image input pattern. It is also possible to reduce the read-out time by omitting the final read-out for any portion of the stimulable phosphor found to be carrying no image in the preliminary read-out.

In the method and apparatus described above, the stimulation energy of the stimulating rays used in the preliminary read-out must be smaller than the stimulation energy of the stimulating rays in the final read-out. Therefore, when exposure of the stimulable phosphor to the stimulating rays is conducted, for example, by scanning with a laser beam, it is necessary to conduct the preliminary read-out by using a means for decreasing the output level of the laser source compared with the output level in the final read-out, a means for increasing the beam diameter of the laser beam compared with the beam diameter in the final read-out, a means for increasing the scanning speed of the laser beam compared with the scanning speed in the final read-out, or the like. Thus, the conditions of exposure to the stimulating rays in the preliminary read-out and the final read-out are different from each other. Therefore, in order to conduct the preliminary read-out, it is necessary to provide the read-out apparatus, for example, with two read-out stages which can conduct read-out under exposure conditions different from each other, or with an adjusting means for adjusting the conditions of exposure to the stimulating rays. However, in the former case, since two read-out means having constructions approximately similar to each other are installed, the read-out apparatus becomes large and complicated. In the latter case, a sophisticated adjusting means is required, making the read-out apparatus complicated and expensive. Further, since there is a limit to the amount in which the scanning speed of the laser beam can be increased and it takes much time to adjust the read-out gain or determine the scale factor by processing the image input information obtained by the preliminary read-out, the time required for the read-out becomes very long when the preliminary read-out is conducted. However, an increase in the read-out time presents a very real problem particularly in the cases as described below. U.S. patent application Nos. 434,883 and 484,738 describe a system wherein an image recording section for recording a radiation image in a stimulable phosphor sheet, an image read-out section for reading out the radiation image stored in the stimulable phosphor sheet, and an erasing means for erasing the radiation energy remaining in the stimulable phosphor sheet after the read-out are integrated into one unit to circulate and reuse the stimulable phosphor sheet (this system will hereinafter be referred to as the built-in type system). In the built-in type system, the recording interval depends on the step requiring the longest time among the steps, i.e. the read-out step. Therefore, when the preliminary read-out is conducted in the built-in type system, the time required for the preliminary read-out results in an increase in the recording interval. An increase in the recording interval presents a very real problem particularly when recording of radiation images of many objects should be conducted at short recording intervals as in the case of mass medical examinations.

SUMMARY OF THE INVENTION

The primary object of the present invention is to provide a radiation image read-out method wherein the preliminary read-out for detecting the image input information stored in a stimulable phosphor sheet can be conducted quickly in a simple manner.

Another object of the present invention is to provide an apparatus for carrying out the radiation image read-out method, which is small in size and simple in construction.

The present invention provides a radiation image read-out method in which a stimulable phosphor sheet carrying a radiation image stored therein is exposed to stimulating rays which cause the stimulable phosphor sheet to emit light in the pattern of the stored image, and the emitted light is photoelectrically read out, wherein the improvement comprises, prior to final read-out for obtaining a visible image for viewing purposes, conducting preliminary read-out for detecting said radiation image by uniformly exposing the whole surface of said stimulable phosphor sheet to stimulating rays and detecting the amount of light emitted from the whole surface of said stimulable phosphor sheet.

The present invention also provides a radiation image read-out method in which a stimulable phosphor sheet carrying a radiation image stored therein is exposed to stimulating rays which cause the stimulable phosphor sheet to emit light in the pattern of the stored image, and the emitted light is photoelectrically read out, wherein the improvement comprises, prior to final read-out for obtaining a visible image for viewing purposes, conducting preliminary read-out for detecting said radiation image by exposing said stimulable phosphor sheet to stimulating rays slitwise over the entire width of said stimulable phosphor sheet, moving the slit-like exposure section with respect to said stimulable phosphor sheet in the direction perpendicular to the width of said stimulable phosphor sheet, and detecting the amount of light emitted from said stimulable phosphor sheet.

The present invention further provides an apparatus for carrying out the radiation image read-out method.

In the present invention, the preliminary read-out for detecting a radiation image stored in a stimulable phosphor sheet prior to final read-out can be conducted very simply and quickly.

DESCRIPTION OF THE PREFERRED EMBODIMENTS

The present invention will hereinbelow be described in further detail with reference to the accompanying drawings.

Figure 1:
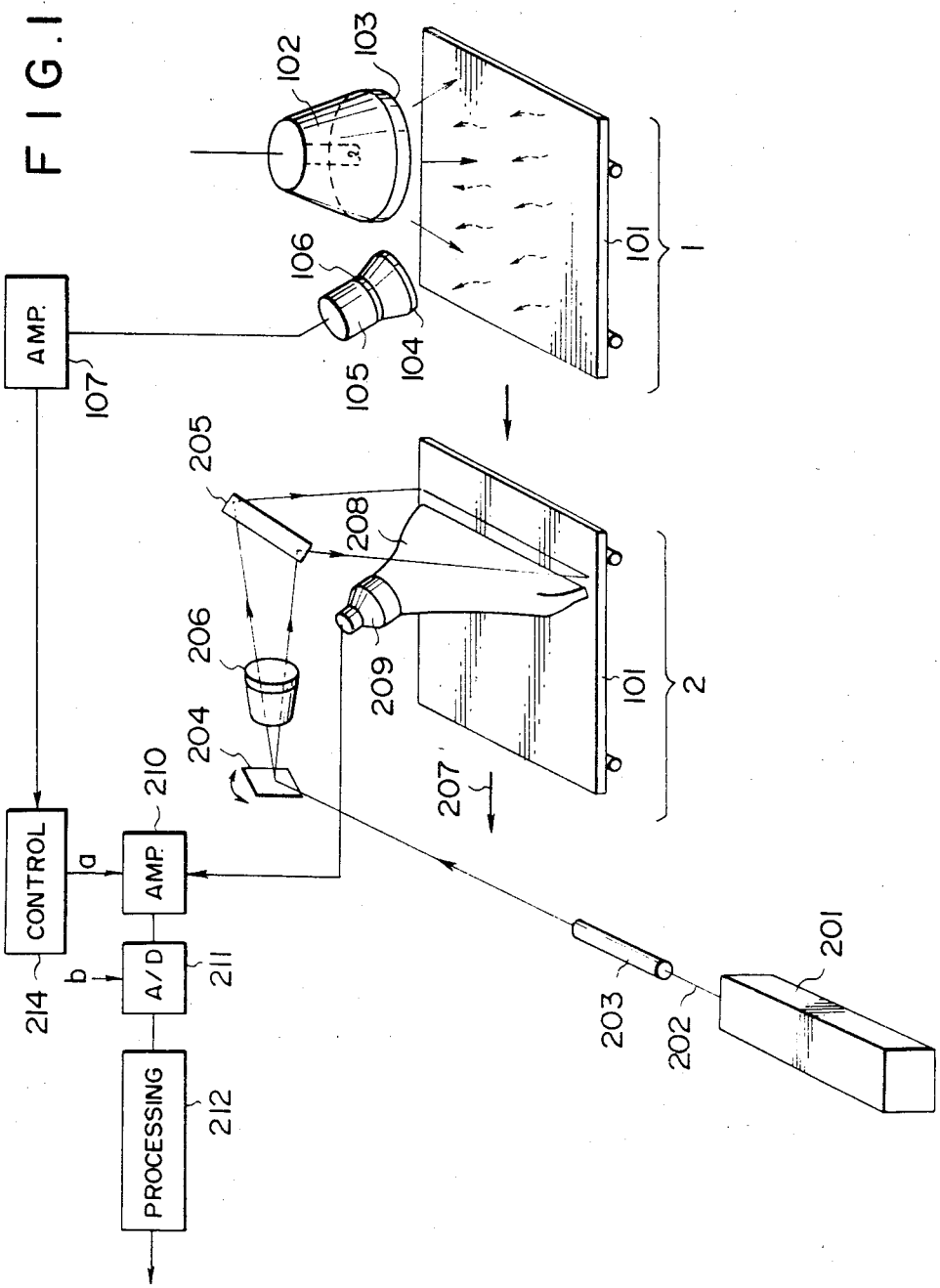
FIG. 1 is a schematic view showing an apparatus for carrying out an embodiment of the radiation image read-out method in accordance with the present invention.

Referring to FIG. 1 showing an X-ray image read-out apparatus for carrying out an embodiment of the radiation image read-out method in accordance with the present invention, the reference numeral 1 designates a preliminary read-out section, and the reference numeral 2 designates a final read-out section.

A stimulable phosphor sheet 101 carrying an X-ray image stored therein is sent to the read-out apparatus for reading out the radiation image. In the read-out apparatus, the stimulable phosphor sheet 101 is first sent to the preliminary read-out section 1, and the preliminary read-out is conducted.

In the preliminary read-out section 1, light emitted from a light source 102 (for example, a xenon lamp) and having a wavelength within the wavelength range of the stimulating rays is passed through a filter 103 for cutting off the light having a wavelength within a range identical with the range of the wavelength of the light emitted from the stimulable phosphor sheet 101 when exposed to the stimulating rays. Then, the light passing through the filter 103 uniformly impinges onto the whole surface of the stimulable phosphor sheet 101. When exposed to the stimulating rays, the stimulable phosphor sheet 101 emits light in proportion to the X-ray energy stored therein. The light emitted from the stimulable phosphor sheet 101 enters a photodetector 105 such as a photomultiplier via a diffuser panel 104. The light receiving face of the photodetector 105 is provided with a filter 106 for transmitting only the light having the wavelength distribution of the light emitted from the stimulable phosphor sheet 101 and cutting off the light having the wavelength distribution of the stimulating rays, so that the photodetector 105 can detect only the light emitted from the stimulable phosphor sheet 101 upon stimulation thereof. The photodetector 105 detects the amount of light emitted from the whole surface of the stimulable phosphor sheet 101. Specifically, the photodetector 105 detects the mean recording level of the radiation image stored in the stimulable phosphor sheet 101. The output of the photodetector 105 is amplified by an amplifier 107, and the signal from the amplifier 107 is sent to a control circuit 214 at the final read-out section 2. Based on the mean recording level obtained, the control circuit 214 immediately calculates an amplification degree setting value (a). When the preliminary read-out is finished as described above, the stimulable phosphor sheet 101 is sent to the final read-out section 2.

In the final read-out section 2, the beam diameter of a laser beam 202 emitted from a laser source 201 is strictly adjusted by a beam expander 203. The laser beam 202 is then deflected by a light deflector 204 such as a galvanometer mirror, and directed onto the stimulable phosphor sheet 101 by a plane reflection mirror 205. Between the light deflector 204 and the plane reflection mirror 205 is positioned an fΘ lens 206, so that the stimulable phosphor sheet 101 may be scanned at a uniform speed with the laser beam 202 having a uniform beam diameter. While the laser beam 202 impinges upon the stimulable phosphor sheet 101, the stimulable phosphor sheet 101 is moved in the direction of the arrow 207 to conduct the sub-scanning and, consequently, the whole area of the stimulable phosphor sheet 101 is exposed to and scanned with the laser beam 202. When exposed to the laser beam 202, the stimulable phosphor sheet 101 emits light in proportion to the X-ray energy stored therein, and the emitted light enters a light guiding sheet 208. The light guiding sheet 208 has a linear light input face positioned close to the scanning line on the stimulable phosphor sheet 101, and a ring-shaped light output face in close contact with the light receiving face of a photodetector 209, which may be a photomultiplier. The light guiding sheet 208 is formed of a transparent thermoplastic resin sheet such as an acrylic resin sheet so that the light entering from the light input face can be transmitted to the light output face by total reflection through the interior of the light guiding sheet 208. The light emitted from the stimulable phosphor sheet 101 upon stimulation thereof is guided in the interior of the light guiding sheet 208, emitted from the light output face of the light guiding sheet 208 and received by the photodetector 209. The light guiding sheet 208 may be of a shape and a material as disclosed in U.S. Pat. No. 4,346,295 (DE-OS No. 2,951,501) or European Patent Publication No. 32,521.

The light receiving face of the photodetector 209 is provided with a filter for transmitting only the light having the wavelength distribution of the light emitted from the stimulable phosphor sheet 101 and cutting off the light having the wavelength distribution of the stimulating rays, so that the photodetector 209 can detect only the light emitted from the stimulable phosphor sheet 101 upon stimulation thereof. The light emitted from the stimulable phosphor sheet 101 and detected by the photodetector 209 is converted to an electric signal, amplified to an appropriate level by an amplifier 210 the sensitivity of which has been set by the amplification degree setting value (a), and then inputted into an A/D converter 211. In the A/D converter 211, the electric signal is converted to a digital signal with a scale factor which has been set by an appropriate scale factor setting value (b) selected according to the pattern of the object to suit the width of signal fluctuation. The digital signal thus obtained is inputted into a signal processing circuit 212, in which it is processed so as to obtain an X-ray image suitable for viewing, particularly for diagnostic purposes. In this manner, a visible image is reproduced on a recording material such as a photographic light-sensitive material, or on a display device such as a CRT.

In the embodiment described above, since the amount of light emitted from the whole surface of the stimulable phosphor sheet is detected, the mean value of the radiation image stored in the stimulable phosphor sheet can be obtained quickly, and the mean density of the whole reproduced image can thereby be stabilized.

Figure 2:
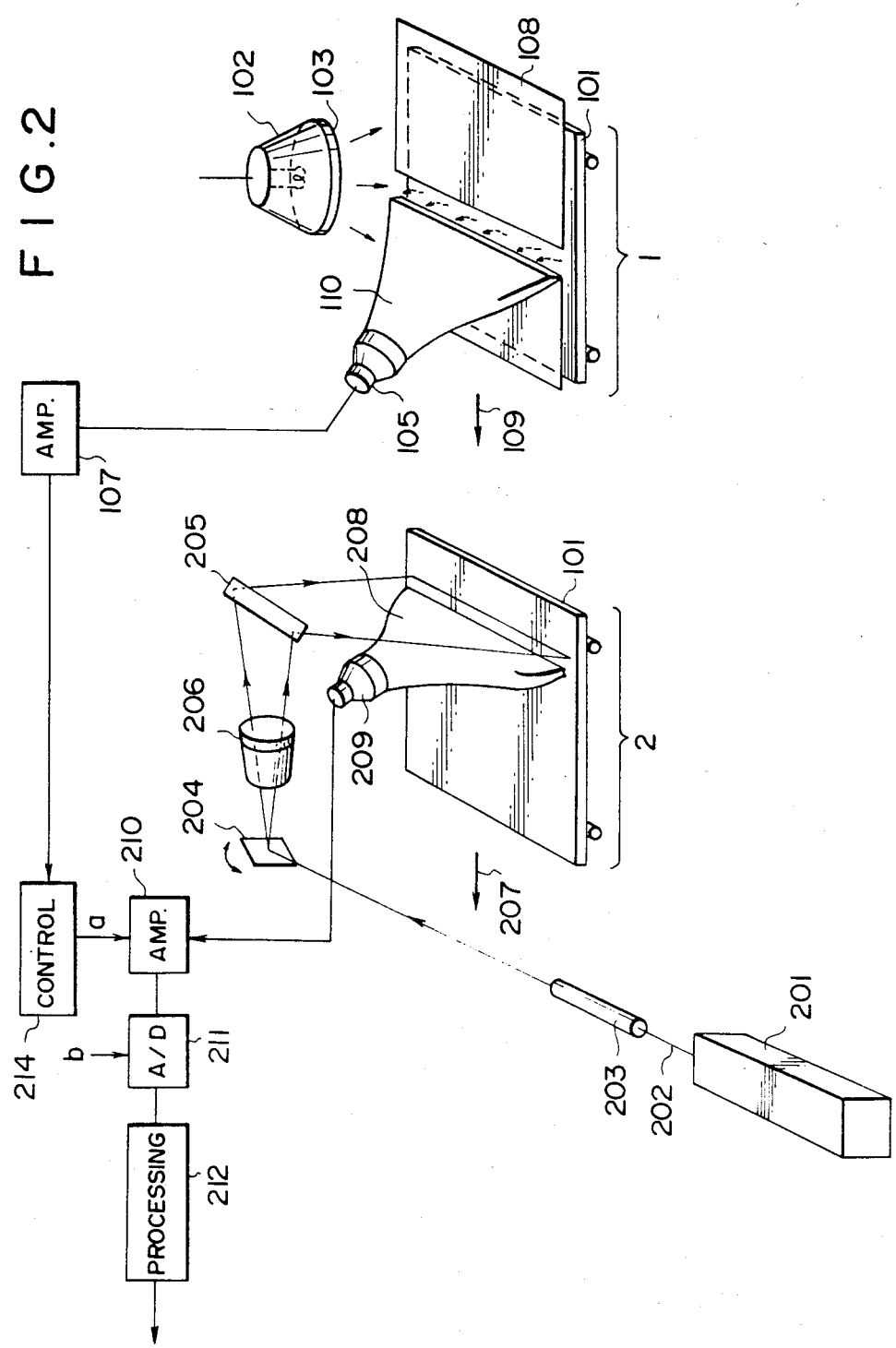
FIG. 2 is a schematic view showing an apparatus for carrying out another embodiment of the radiation image read-out method in accordance with the present invention.

FIG. 2 shows an X-ray image read-out apparatus for carrying out another embodiment of the radiation image read-out method in accordance with the present invention. In this embodiment, the preliminary read-out section 1 is so constructed that the stimulable phosphor sheet 101 is moved below a light-shielding plate 108 provided with a slit-like opening covering the entire width of the stimulable phosphor sheet 101. A light guiding sheet 110 is positioned so that the light input face thereof is close to the slit-like opening of the light-shielding plate 108. The light output face of the light guiding sheet 110 is closely contacted with the photodetector 105. Above the slit-like opening of the light-shielding plate 108 is positioned the light source 102 for emitting stimulating rays to the stimulable phosphor sheet 101.

In the embodiment of FIG. 2, the preliminary read-out of the stimulable phosphor sheet 101 carrying an X-ray image stored therein is conducted as described below.

In the preliminary read-out section 1, stimulating rays emitted from the light source 102 are passed through the filter 103 for cutting off the light having a wavelength within a range identical with the range of the wave length of the light emitted from the stimulable phosphor sheet 101 when exposed to the stimulating rays. Then, the stimulating rays are directed onto the stimulable phosphor sheet 101 slitwise over the entire width of the sheet 101 through the slit-like opening of the light-shielding plate 108. While the stimulating rays are being directed onto the stimulable phosphor sheet 101, the stimulable phosphor sheet 101 is moved perpendicularly to its width, i.e., in the direction of the arrow 109 and, consequently, the whole area of the stimulable phosphor sheet 101 is exposed to the stimulating rays. The light emitted from the stimulable phosphor sheet 101 when exposed to the stimulating rays passes into the light guiding sheet 110 from the light input face, transmits through the interior of the light guiding sheet 110 by total reflection up to the light output face, and is received by the photodetector 105.

The light receiving face of the photodetector 105 is provided with a filter for transmitting only the light having the wavelength distribution of the light emitted from the stimulable phosphor sheet 101 and cutting off the light having the wavelength distribution of the stimulating rays, so that the photodetector 105 can detect only the light emitted from the stimulable phosphor sheet 101 upon stimulation thereof. The signal detected by the photodetector 105 is sequentially amplified by the amplifier 107 and then sent to the control circuit 214. On the basis of the mean recording level of each portion of the stimulable phosphor sheet 101 (i.e. the mean recording level in the unit of the slit-like opening) obtained as described above, the control circuit 214 calculates the amplification degree setting value (a). After the preliminary read-out is finished, final read-out is conducted on the stimulable phosphor sheet 101 in the same manner as described in the first embodiment of FIG. 1, and the radiaiton image stored in the stimulable phosphor sheet 101 is converted to a visible image for viewing purposes. In the embodiment of FIG. 2, the scale factor setting value (b) for the final read-out may be set to an appropriate value in advance as in the first embodiment. Alternatively, the scale factor setting value (b) may be changed for the respective images (stimulable phosphor sheet) according to the fluctuation in the mean recording level in the unit of the slit opening.

Further, in the embodiment of FIG. 2, instead of exposing the stimulable phosphor sheet 101 slitwise to the stimulating rays by use of the light-shielding plate 108 provided with the slit-like opening, the stimulating rays emitted from the light source 102 may be condensed in the form of a slit by use of an optical means and directed onto the stimulable phosphor sheet 101. Further, instead of moving the stimulable phosphor sheet 101, the scanning line of the slit-like stimulating rays may be moved to expose the whole surface of the stimulable phosphor sheet 101 to the stimulating rays.

Also in the embodiment of FIG. 2, the mean value of the radiation image stored in the stimulable phosphor sheet can be obtained quickly, and the mean density of the whole reproduced image can thereby be stabilized.

In the embodiments described above, adjustment of the read-out gain is conducted by changing the amplification degree of the amplifier for the photodetector. However, when a photomultiplier is used as the photodetector, it is also possible to adjust the gain of the photodetector directly by changing the voltage applied to the photomultiplier.

We claim:

1. A radiation image read-out method in which a stimulable phosphor sheet carrying a radiation image stored therein is exposed to stimulating rays which cause the stimulable phosphor sheet to emit light in the pattern of the stored image, and the emitted light is photoelectrically read out, wherein, prior to final read-out for obtaining a visible image for viewing purposes, conducting preliminary read-out for detecting said radiation image by uniformly exposing the whole surface of said stimulable phosphor sheet to stimulating rays and detecting the amount of light emitted from the whole surface of said stimulable phosphor sheet.

2. A method as defined in claim 1 wherein the mean recording level of said radiation image stored in said stimulable phosphor sheet is detected by said preliminary read-out, and an amplification degree setting value for said final read-out is calculated from said mean recording level.

3. A method as defined in claim 1 wherein said final read-out is conducted by scanning said stimulable phosphor sheet with stimulating rays.

4. A method as defined in claim 3 wherein said stimulating rays in said final read-out are laser beam rays.

5. A radiation image read-out method in which a stimulable phosphor sheet carrying a radiation image stored therein is exposed to stimulating rays which cause the stimulable phosphor sheet to emit light in the pattern of the stored image, and the emitted light is photoelectrically read out, wherein, prior to final read-out for obtaining a visible image for viewing purposes, conducting preliminary read-out for detecting said radiation image by exposing said stimulable phosphor sheet to stimulating rays slitwise over the entire width of said stimulable phosphor sheet, moving a slit-like exposure section with respect to said stimulable phosphor sheet in the direction perpendicular to the width of said stimulable phosphor sheet, and detecting the amount of light emitted from said stimulable phosphor sheet.

6. A method as defined in claim 5 wherein the mean recording level of said radiation image stored in said stimulable phosphor sheet is detected by said preliminary read-out, and an amplification degree setting value for said final read-out is calculated from said mean recording level.

7. A method as defined in claim 5 wherein said final read-out is conducted by scanning said stimulable phosphor sheet with stimulating rays.

8. A method as defined in claim 7 wherein said stimulating rays in said final read-out are laser beam rays.

9. A radiation image read-out apparatus comprising stimulating ray emitting means for emitting stimulating rays to a stimulable phosphor sheet carrying a radiation image stored therein, means for moving said stimulable phosphor sheet, final light detecting means for photoelectrically reading out light emitted from said stimulable phosphor sheet in proportion to the radiation energy stored therein upon exposure thereof to said stimulating rays, means for uniformly exposing the whole surface of said stimulable phosphor sheet to stimulating rays prior to final read-out for obtaining a visible image for viewing purposes, and light detecting means for photoelectrically detecting the amount of light emitted from the whole surface of said stimulable phosphor sheet.

10. A radiation image read-out apparatus comprising; a stimulating ray emitting means for emitting stimulating rays to a stimulable phosphor sheet carrying a radiation image stored therein, means for moving said stimulable phosphor sheet, and light detecting means for photoelectrically reading out light emitted from said stimulable phosphor sheet in proportion to the radiation energy stored therein upon exposure thereof to said stimulating rays, means for exposing said stimulable phosphor sheet to stimulating rays slitwise over the entire width of said stimulable phosphor sheet prior to final read-out for obtaining a visible image for viewing purposes, means for moving a slit-like exposure section with respect to said stimulable phosphor sheet perpendicularly to the width of said stimulable phosphor sheet, and light detecting means for photoelectrically detecting the amount of light emitted from said stimulable phosphor sheet.

* * * * *